Aug. 26, 1947. P. N. SITTON 2,426,244
DOLLY
Filed Jan. 1, 1945 2 Sheets-Sheet 1
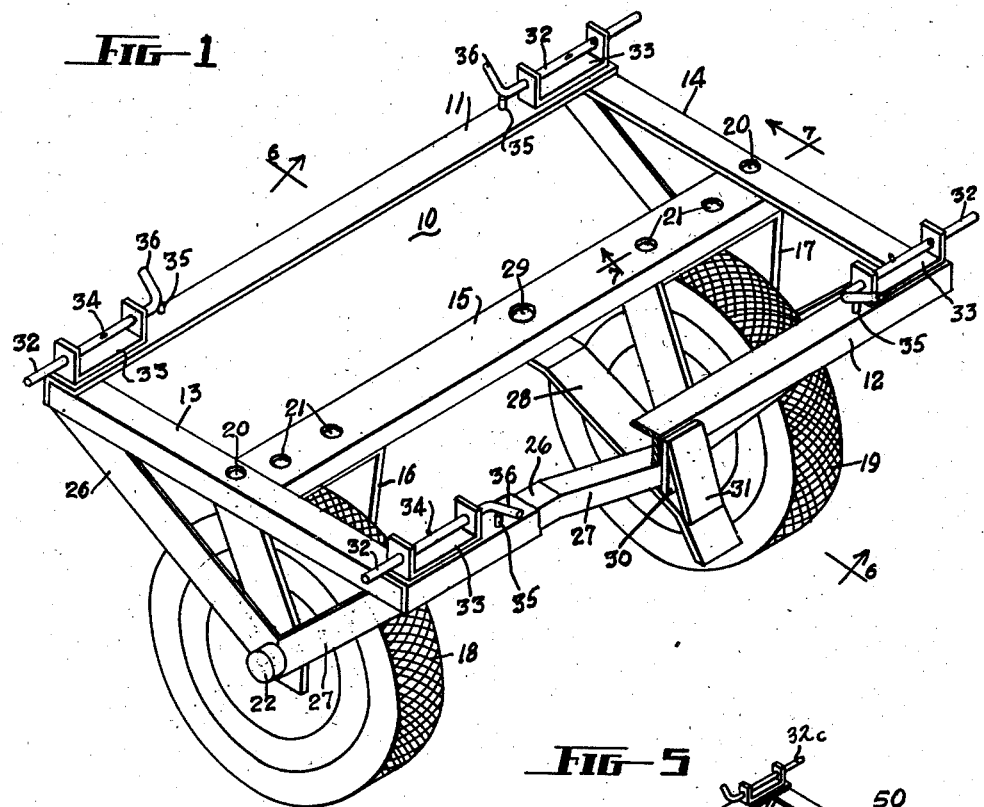
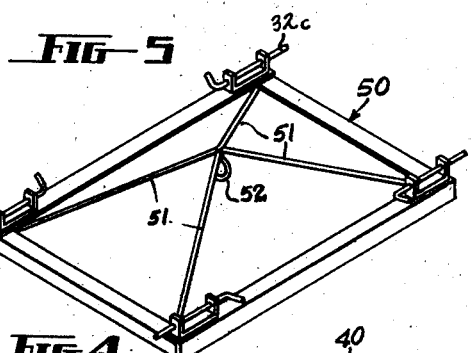
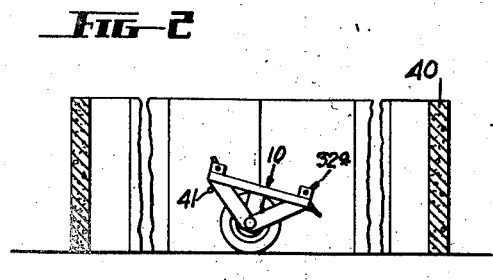
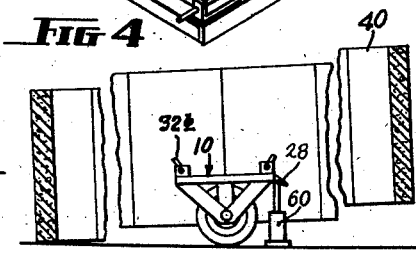
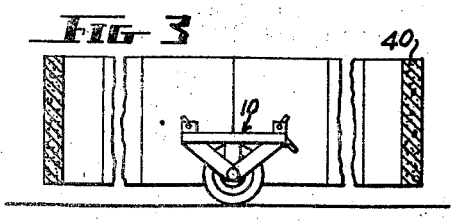
INVENTOR
PHILIP N. SITTON,
BY
ATTORNEYS Aug. 26, 1947.  P. N. SITTON  2,426,244
DOLLY
Filed Jan. 1, 1945  2 Sheets-Sheet 2
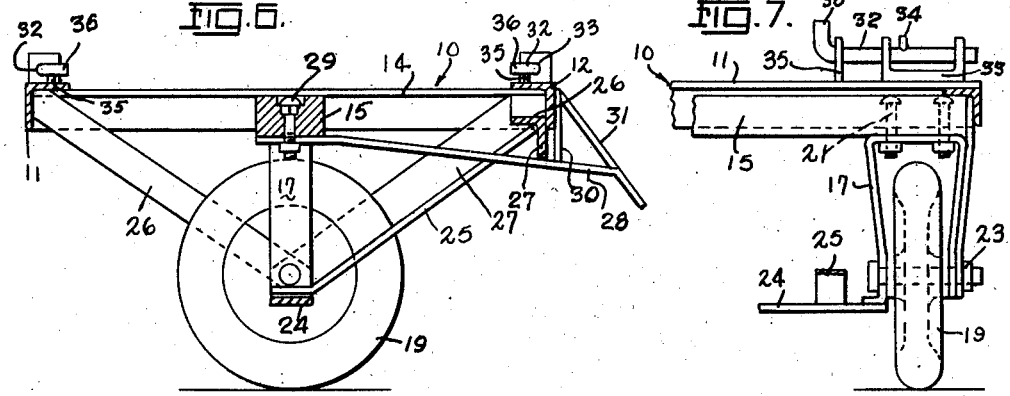
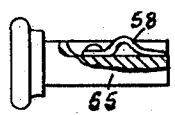
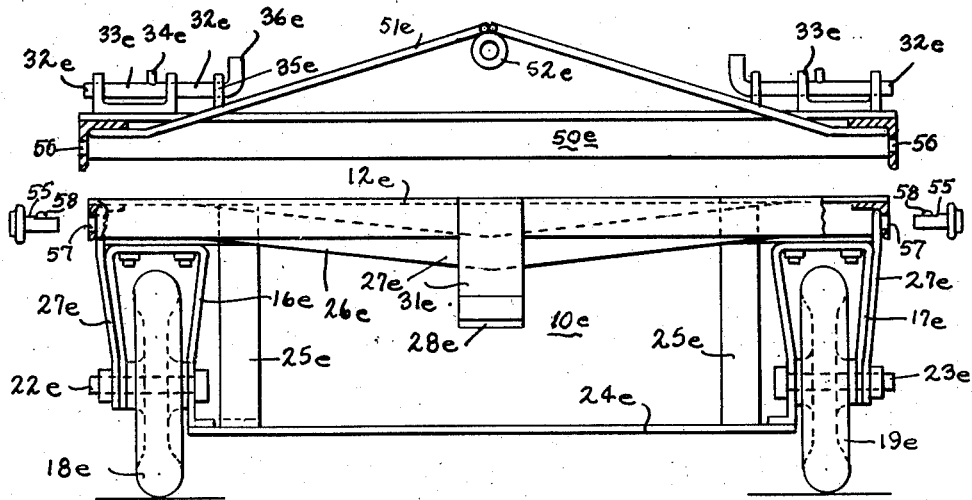
INVENTOR
PHILIP N. SITTON,
BY
Toulmin & Toulmin
ATTORNEYS Patented Aug. 26, 1947

2,426,244

UNITED STATES PATENT OFFICE 2,426,244

DOLLY

Philip N. Sitton, Dayton, Ohio

Application January 1, 1945, Serial No. 570,857

12 Claims. (Cl. 280—61)

This invention relates to a carriage device or dolly adapted for the transportation of heavy articles such as sections of a cast concrete septic tank.

An object of the invention is to provide a carriage vehicle or dolly that is adapted to support heavy loads and to transport them readily from one place to another.

Still another object of the invention is to provide a carriage or dolly adapted to be placed within the hollow body section of a cast concrete septic tank, and to engage the sidewalls of the same so that the septic tank can be lifted upon the dolly and thereafter be transported from one place to another.

Further objects and advantages will become apparent from the drawings and the following description.

In the drawings:

Figure 1 is a perspective elevational view of the carriage or dolly of this invention.

Figures 2, 3 and 4 show the manner in which the dolly is used to carry sections of a concrete septic tank for transportation from one place to another.

Figure 5 is a perspective elevational view of a frame adapted to be positioned within a concrete septic tank when a crane is available for raising the same.

Figure 6 is a vertical cross-sectional view of the dolly taken along line 6—6 of Figure 1;

Figure 7 is a vertical cross-sectional view taken along line 7—7 of Figure 1.

Figure 8 is a vertical transverse cross-sectional view, partially in elevation, of a modified arrangement of the dolly of this invention.

Figure 9 is an elevational view, partially in cross-section, of a pin connection used in the dolly illustrated in Figure 8.

The carriage or dolly of this invention is particularly adapted for use in transporting sections of a cast concrete septic tank from one place to another. It will be appreciated that sections of a septic tank of any size, when constructed from concrete, are quite heavy. Also, in view of the bulk of the sections of such a concrete septic tank, difficulty would be experienced in raising the sections on suitable carrying devices. The carriage or dolly of this invention provides a means whereby a section of a concrete septic tank can readily be raised and lowered from a stationary support so that the section can be moved about, and loaded and unloaded from a truck.

In this invention, the dolly consists of a rectangular frame 10 composed of a pair of angle bars 11 and 12 that are joined by a pair of angle bars 13 and 14. The aforementioned angle bars are suitably welded together to form a rectangular frame.

A beam 15 extends across the frame 10 halfway between the angle bars 11 and 12, and is suitably secured to the angle bars 13 and 14 by means of bolts 20. Wheel brackets 16 and 17 are suitably secured to the beam 15 by means of the bolts 21, wheel brackets 16 and 17 being generally U-shaped to receive the stub axles 22 and 23 of the wheels 18 and 19, respectively.

A brace bar 24 extends between the U-shaped wheel brackets 16 and 17 to brace the same. Also, a brace bar 25 extends between each end of the bar 24 and the frame member 12 to brace the bar 24 and the wheel brackets 16 and 17.

Brace bars 26 and 27 extend between the lower end of the wheel brackets 16 and 17 and the frame members 11 and 12 to provide additional bracing for the wheel brackets, and also to provide a triangular structure at each end of the frame 10 to increase the rigidity of the frame.

An angle bar 26 is positioned beneath the frame member 12, and is provided with a depressed portion 27 in the center part thereof. The angle bar 26 is suitably welded to the frame member 12.

To raise and lower the carriage 10, that is to rotate the same about the axis of the wheels 18 and 19 for raising and lowering a septic tank section in a manner hereinafter described, an extension or platform 28 is provided. This platform is secured to the beam 15 at one end by means of the bolt 29, and is welded to the angle bar 27. The platform 28 extends beyond the frame member 12 and has a pair of bars 30 and 31 extending between the platform 28 and the frame member 12 to form a triangular support for the platform member 28 and thereby provide means to prevent the same from bending when a force is applied upwardly upon the extending end of the platform member 28.

At each corner of the frame 10 there is provided a latching bolt 32 carried in a bracket 33, the bracket 33 being suitably secured to the frame 10. The latching bolt 32 is adapted to extend beyond the frame 10 for engagement with a device to be carried upon the dolly. A stop pin 34 is provided in the bolt 32 to prevent removal of the bolt from the bracket 33. Also, a pin 35 is provided adjacent the bracket 33 adapted to be engaged by the angular end 36 of the bolt 32 when the bolt is extended beyond the frame 10, and therefore prevent accidental removal of the bolt from engagement with the device being carried upon the dolly.

The dolly is particularly adapted for transporting heavy articles from one place to another such as sections of a concrete septic tank illustrated in Figures 2, 3 and 4. The sections 40 of a concrete septic tank are provided with holes 41 in opposite sidewalls thereof adapted to receive the bolts 32, whereupon the septic tank is supported upon the dolly.

In Figures 2, 3 and 4 the manner of use of the dolly in raising a section of a concrete septic tank from the floor and for transporting the same, is illustrated. In Figure 2, the dolly or carriage 10 has been placed within the hollow body of a section 40 of a septic tank. The forward bolts 32a are then extended beyond the frame of the dolly to engage holes 41 in the sidewalls of the tank section 40. A lifting-jack 60 is then placed beneath the platform 28 to rotate the dolly upon the axis of the wheels 18 and 19, as illustrated in Figure 4, thus bringing the rear bolts 32b into alignment with the rearwardly positioned holes 41 in the sidewalls of the tank section 40. The bolts 32b may then be extended into the holes in alignment therewith, and the jack 60 removed, whereupon the tank section 40 is balanced upon the dolly 10 as illustrated in Figure 3 and one man can move a heavy section of a concrete septic tank from one place to another without difficulty. When the section 40 is to be removed from the dolly, the procedure is just reversed in that the jack 60 is placed under the platform 28 and the rear pins 32 removed, whereupon the jack can be lowered until the tank section 40 rests upon the floor and the forward pins 32a be removed.

In Figure 5 there is illustrated a frame 50, preferably of angle bar construction, that is provided with the bolts 32c identical with the bolts 32 heretofore referred to. This frame 50 is provided with the bars or rods 51 welded at each corner of the frame 50 and brought to a common central point in the middle of the frame 50, and the bars 51 are then welded together. A crane hook can then be inserted beneath the bars 51 to raise the frame 50, a loop 52 being provided to prevent movement of the crane hook relative to the bars 51.

The frame 50 can be used whenever a crane is available for raising and lowering the tank sections 40, the bolts 32c on the frame 50 being adapted to be located in the holes 41 of the tank section 40 in the same manner as the bolts 32 of the dolly 10.

In Figure 8 there is illustrated a slightly modified arrangement of the construction of the dolly of this invention wherein the dolly illustrated in Figure 1 and the frame illustrated in Figure 5 are brought together into one article of manufacture, but which may be separated to perform their individual functions. In so far as the dolly 10e is concerned, the construction of the frame is identical with that heretofore disclosed and described with regard to Figure 1, the only exception being that the bolts 32 and their cooperating brackets 33 are not placed upon the frame of the dolly. Therefore, the numerals applied to Figure 8 are identical to the numerals applied to the dolly of Figure 1 except that the suffix e has been applied to the various numerals.

The frame 50e is identical in construction to the frame 50 disclosed in Figure 5, the only exception being that the frame 50e is adapted to rest upon the frame of the dolly 10e and fit thereover. The frame 50e carries the bolts 32e that are adapted to engage the holes provided in the tank section 40 for the purpose hereinbefore described.

To hold the frame 50e upon the dolly 10e, pins 55 are adapted to extend through the holes 56 in the frame 50e and the holes 57 in the dolly 10e, which are in alignment when the frame 50e is placed upon the dolly 10e. The pins 55 have a small spring 58 adapted to lock behind the frame of the dolly 10e to hold the pins 55 in place.

The use of the dolly illustrated in Figure 8 is identical with the use of the dolly heretofore disclosed and described, but in addition, the pins 55 can be removed from out of engagement with the holes 56 and 57 to permit a crane to lift a tank section 40 directly from the dolly without dequiring a shifting of the two pieces of mechanism, as is necessary when using the individual devices illustrated in Figures 1 and 5.

While the apparatus disclosed and described herein constitutes preferred forms of the invention, yet it will be appreciated that the apparatus is capable of mechanical alteration without departing from the spirit of the invention, and that all modifications that fall within the scope of the appended claims are intended to be included herein.

Having thus fully described my invention, what I claim as new and desire to secure by Letters Patent is:

1. A carriage or dolly comprising a frame having a cross beam, bracket means extending downwardly from said cross beam and upon which wheel means are carried, brace means extending between said bracket means and said frame, bolt means slidably carried at each corner of the frame for extension beyond the frame to engage a device to be carried thereupon, and means extending beyond said frame substantially normal to the axis of the wheel means adapted to be engaged by a lifting means for rotating the frame upon the axis of the wheel means.

2. A carriage or dolly comprising, a substantially rectangular frame, beam means extending across said frame substantially midway between the front and rear edges thereof, bracket means carried on said beam means and extending downwardly therefrom, wheel means supported on said bracket means, brace means bracing said bracket means against movement relative to said frame, and bolt means slidably carried at each corner of said frame for extending beyond the frame to engage a device to be carried thereon.

3. A carriage or dolly comprising, a substantially rectangular frame, beam means extending transversely across said frame substantially midway between the front and rear edges thereof, bracket means carried by said beam means on each end thereof extending downwardly therefrom, wheel means carried by each of said bracket means, brace bars extending between the lower ends of said bracket means and said frame to thereby provide a triangular truss for reinforcing said frame, and bolt means slidably carried upon each corner of said frame for extension beyond said frame to engage a device to be carried thereon.

4. A carriage or dolly comprising, a substantially rectangular frame, beam means extending transversely across said frame substantially midway between the front and rear edges thereof, bracket means carried by said beam means on each end thereof extending downwardly therefrom, wheel means carried by each of said bracket means, brace bars extending between the lower ends of said bracket means and said frame to thereby provide a triangular truss for reinforcing said frame, bolt means slidably carried upon each corner of said frame for extension beyond said frame to engage a device to be carried thereon, and means extending beyond the forward edge of said frame substantially midway between the side edges thereof adapted to be engaged by a lifting means for rotating said frame about the axis of said wheel means.

5. A carriage or dolly comprising, a substantially rectangular frame, beam means extending transversely across said frame substantially midway between the front and rear edges thereof, bracket means carried by said beam means on each end thereof extending downwardly therefrom, wheel means carried by each of said bracket means, brace bars extending between the lower ends of said bracket means and said frame to thereby provide a triangular truss for reinforcing said frame, and bolt means slidably carried upon each corner of said frame for extension beyond said frame to engage a device to be carried thereon, each of said bolt means comprising a U-shaped bracket secured at each corner of said frame, and a bolt means slidable in the legs of said bracket for extension beyond said frame.

6. A carriage or dolly comprising, a substantially rectangular frame, beam means extending transversely across said frame substantially midway between the front and rear edges thereof, bracket means carried by said beam means on each end thereof extending downwardly therefrom, wheel means carried by each of said bracket means, brace bars extending between the lower ends of said bracket means and said frame to thereby provide a triangular truss for reinforcing said frame, bolt means slidably carried upon each corner of said frame for extension beyond said frame to engage a device to be carried thereon, each of said bolt means comprising a U-shaped bracket secured at each corner of said frame, a bolt means slidable in the legs of said bracket for extension beyond said frame, and means adjacent each of said bracket means on said frame to hold said bolt means in extended position.

7. A carriage or dolly comprising a substantially rectangular frame, beam means extending transversely across said frame substantially midway between the front and rear edges thereof, U-shaped bracket means carried on each end of said beam means and extending downwardly therefrom, wheel means carried in each of said bracket means, brace bar means extending between adjacent inner legs of said U-shaped bracket means, brace means extending between said brace bar means and said frame to prevent fore and aft movement of said bracket means, brace bar means extending between the lower ends of each of said U-shaped brackets and said frame to provide a triangular truss therewith, and bolt means slidably carried on each corner of said frame for extension beyond the same to engage a device to be carried upon said frame.

8. A carriage or dolly comprising a substantially rectangular frame, beam means extending transversely across said frame substantially midway between the front and rear edges thereof, U-shaped bracket means carried on each end of said beam means and extending downwardly therefrom, wheel means carried in each of said bracket means, brace bar means extending between adjacent inner legs of said U-shaped bracket means, brace means extending between said brace bar means and said frame to prevent fore and aft movement of said bracket means, brace bar means extending between the lower ends of the outer legs of each of said U-shaped brackets and said frame to provide a triangular truss therewith, bolt means slidably carried on each corner of said frame for extension beyond the same to engage a device to be carried upon said frame, and bar means extending between said beam and said frame substantially normal to the axis of said wheel means and extending beyond said frame and adapted to be engaged by a lifting means for rotating said frame about the axis of said wheels.

9. A carriage or dolly comprising a substantially rectangular frame, beam means extending transversely across said frame substantially midway between the front and rear edges thereof, U-shaped bracket means carried on each end of said beam means and extending downwardly therefrom, wheel means carried in each of said bracket means, brace bar means extending between adjacent inner legs of said U-shaped bracket means, brace means extending between said brace bar means and said frame to prevent fore and aft movement of said bracket means, brace bar means extending between the lower ends of the outer legs of each of said U-shaped brackets and said frame to provide a triangular truss therewith, a substantially rectangular sub-frame positioned upon said first mentioned frame and removable therefrom, bolt means slidably carried at each corner of said sub-frame for extension therebeyond and adapted to engage a device to be carried upon the said carriage or dolly, and means on said sub-frame adapted to be engaged by a lifting mechanism for raising said sub-frame from said first-mentioned frame.

10. A carriage or dolly comprising a substantially rectangular frame, beam means extending transversely across said frame substantially midway between the front and rear edges thereof, U-shaped bracket means carried on each end of said beam means and extending downwardly therefrom, wheel means carried in each of said bracket means, brace bar means extending between adjacent inner legs of said U-shaped bracket means, brace means extending between said brace bar means and said frame to prevent fore and aft movement of said bracket means, brace bar means extending between the lower ends of the outer legs of each of said U-shaped brackets and said frame to provide a triangular truss therewith, a substantially rectangular sub-frame positioned upon said first mentioned frame and removable therefrom, bolt means slidably carried at each corner of said sub-frame for extension therebeyond and adapted to engage a device to be carried upon the said carriage or dolly, means on said sub-frame adapted to be engaged by a lifting mechanism for raising said sub-frame from said first-mentioned frame, and means extending between said first mentioned frame and said sub-frame to detachably hold them together.

11. A carriage device or dolly comprising a substantially rectangular main frame, bracket means extending downwardly from said frame, wheel means supported upon said bracket means, brace means extending between the lower edges of said bracket means and said main frame to prevent fore and aft movement of said bracket means relative to said main frame, a substantially rectangular sub-frame removably positioned upon said main frame, bolt means slidably carried upon each corner of said sub-frame for extension beyond the same to engage a device adapted to be carried by said carriage or dolly, and means on said sub-frame adapted to be engaged by a lifting device whereby to lift the sub-frame from the main frame.

12. A carriage device or dolly comprising a substantially rectangular main frame, bracket means extending downwardly from said frame, wheel means supported upon said bracket means, brace means extending between the lower edges of said bracket means and said main frame to prevent fore and aft movement of said bracket means relative to said main frame, a substantially rectangular sub-frame removably positioned upon said main frame, bolt means slidably carried upon each corner of said sub-frame for extension beyond the same to engage a device adapted to be carried by said carriage or dolly, means on said sub-frame adapted to be engaged by a lifting device whereby to lift the sub-frame from the main frame, and means detachably connecting the sub-frame to the main frame.

PHILIP N. SITTON.

REFERENCES CITED

The following references are of record in the file of this patent:

UNITED STATES PATENTS

| Number | Name | Date |
|--------|------|------|
| 511,793 | Philion | Jan. 2, 1894 |
| 908,372 | Ackerman | Dec. 29, 1908 |
| 1,587,842 | Knox | June 8, 1926 |
| 2,174,063 | Richards | Sept. 26, 1939 |
| 1,563,533 | Sinks | Dec. 1, 1925 |
| 900,455 | Weir | Oct. 6, 1908 |